Nov. 7, 1950     C. S. NICHOLS     2,528,903
RETRACTABLE WINDSHIELD VISOR
Filed Feb. 28, 1946     2 Sheets-Sheet 1
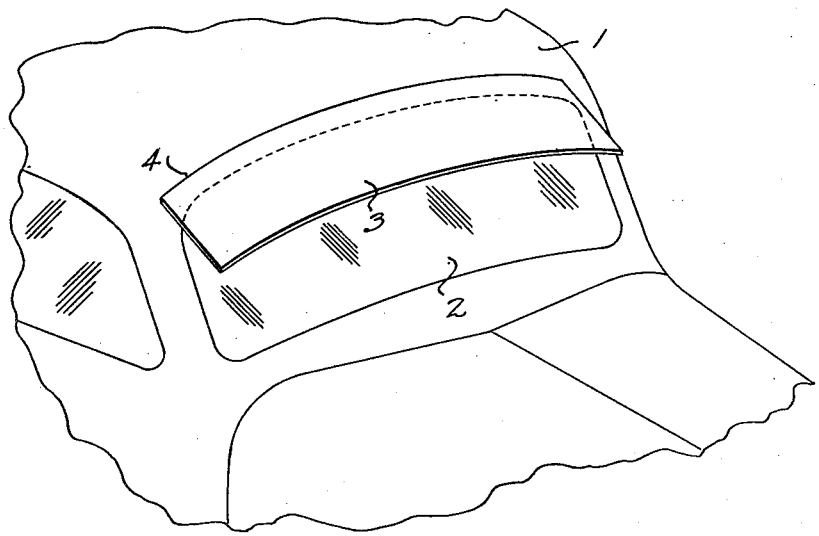
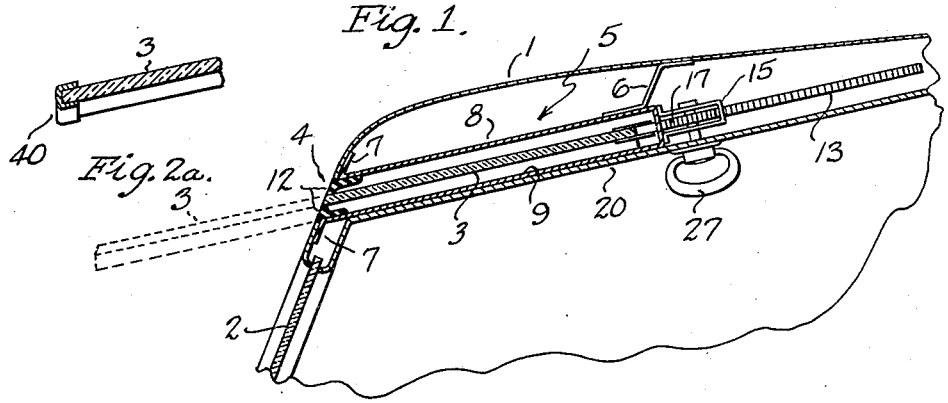
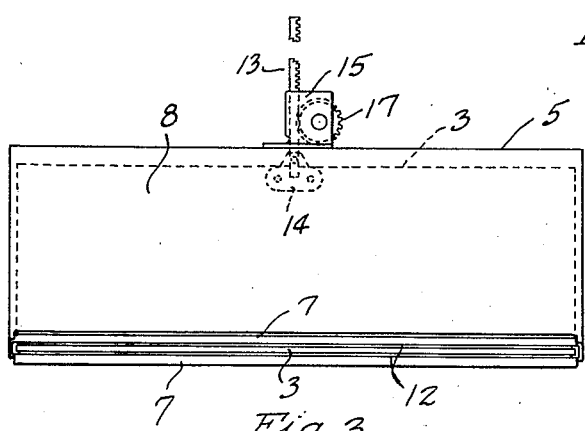
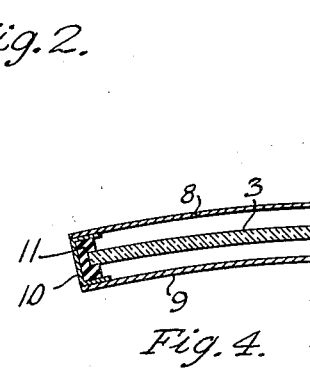
INVENTOR
Christabel S. Nichols
BY
Wooster & Davis
ATTORNEYS Nov. 7, 1950     C. S. NICHOLS     2,528,903
RETRACTABLE WINDSHIELD VISOR
Filed Feb. 28, 1946     2 Sheets-Sheet 2
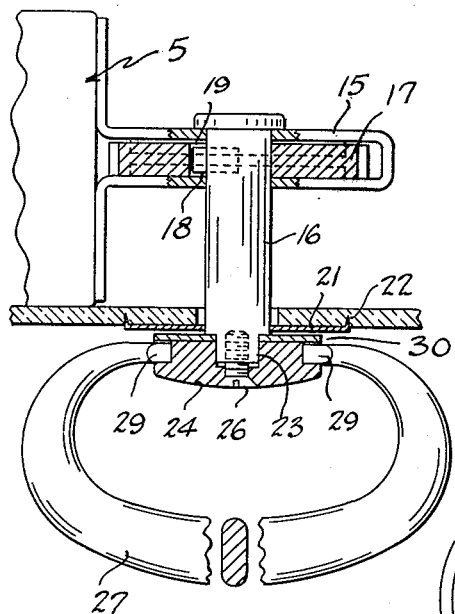
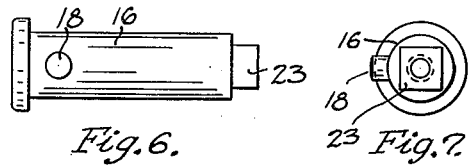
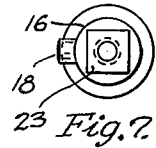
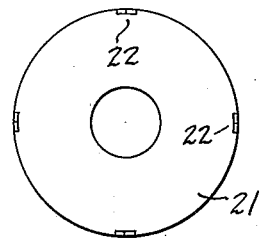
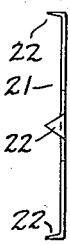
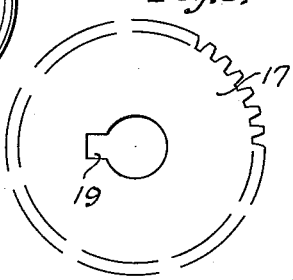
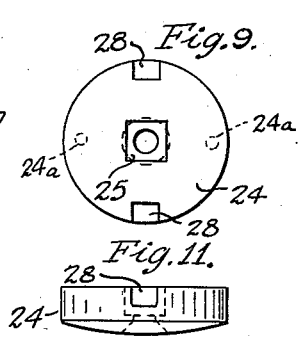
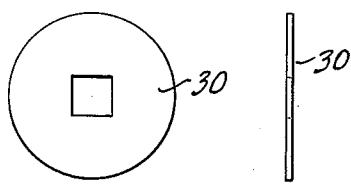
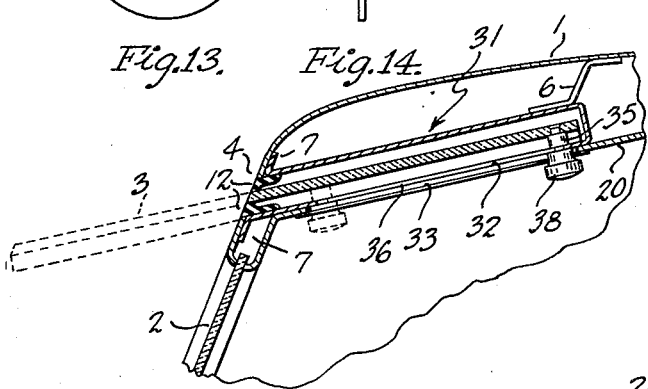
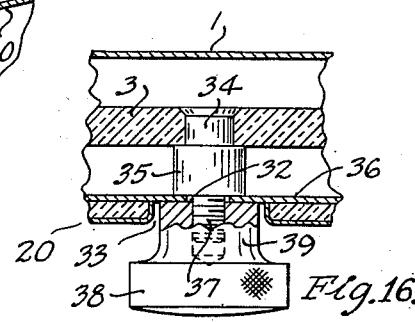
INVENTOR
Christabel S. Nichols
BY
Wooster & Davis
ATTORNEYS.

Patented Nov. 7, 1950

2,528,903

UNITED STATES PATENT OFFICE 2,528,903

RETRACTABLE WINDSHIELD VISOR

Christabel S. Nichols, Fairfield, Conn.

Application February 28, 1946, Serial No. 650,779

1 Claim. (Cl. 296—95)

This invention relates to a windshield visor for automobiles, and has for an object to provide a simple and improved visor construction and arrangement which will more effectively keep the windshield clear of rain, snow, and ice than those now generally employed.

Another object is to provide such a visor which may also be used as an anti-glare visor to prevent blinding of the driver by the sun or lights.

Another object is to provide a construction in which the visor may be shifted between a position of use forwardly of and over the windshield and a retracted position within the car by a simple and effective means within the car whereby it may be easily and quickly shifted between these positions by the driver without changing his driving position, and secured in adjusted positions.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a perspective view of a portion of an automobile showing the windshield and associated portions of the body, and my improved visor projected into operative position;

Fig. 2 is a longitudinal vertical section substantially at the center of the visor;

Fig. 2a is a longitudinal section of the front portion of a visor showing a slight modification;

Fig. 3 is a top plan view of the casing mounting the visor;

Fig. 4 is a partial transverse section of the casing and visor at one side thereof;

Fig. 5 is a detail section showing the means for shifting the visor of Figs. 2 and 3;

Figs. 6 and 7 are a side and end elevation respectively of the operating shaft or spindle;

Figs. 8 and 9 are top and side elevations respectively of a plate to cover the shaft opening;

Fig. 10 is a side elevation of the operating gear or pinion;

Figs. 11 and 12 are a top plan and side elevation respectively of the mounting base for the operating handle;

Figs. 13 and 14 are a plan and side elevation respectively of a spring steel washer used in mounting the handle;

Fig. 15 is a longitudinal section similar to Fig. 2 showing a somewhat modified construction, and Fig. 16 is a detail section showing the visor shifting means of Fig. 15.

With the modern type of car the windshield is usually considerably inclined, making it difficult for the usual windshield wiper to keep the windshield clean and clear in stormy weather, and particularly is this true in sleet and snow or icing conditions. It is an object of the present invention to overcome these difficulties by means of a construction and arrangement which will keep the larger part of the rain, snow or ice from getting onto the windshield, thus greatly relieving the work of the usual windshield wiper or eliminating altogether the necessity of operating the windshield wiper, and, further, to provide a construction which may in addition be used in clear weather as a sun visor to prevent blinding of the driver, and eliminating the necessity of auxiliary sun visors within the car, but still will not interfere with observation of overhead traffic lights and full visibility by the driver.

In the drawing is shown somewhat diagrammatically the front portion 1 of a transversely curved car top in the front wall of which is the inclined windshield 2 of glass or other transparent material, and mounted in the front wall immediately over the windshield is my improved visor 3. The front wall over the windshield is provided with a transversely curved slot 4, the slot being preferably curved substantially the same as the transverse curvature of the top wall so that the visor, which is similarly transversely curved, will more nearly blend into the surface of the top. This visor is preferably of a width substantially that of the windshield, so that when in projected position it protects the entire windshield, and it is made of a relatively heavy or thick sheet of molded transparent or semi-transparent plastic material, and by its transverse curvature it has great strength and stiffness in addition to its natural strength and rigidity, so that when it is extended to its operative position, as shown in full lines Fig. 1 and dotted lines Figs. 2 and 15, no auxiliary or additional supports are required, and it is well able to withstand the pressures of the wind. It may be colored, if desired, such, for example, as certain amber shades to eliminate the glare of the sun or bright lights, and may be molded either plain or with electrical heating units supplied with current from the car battery or generator, such as are sometimes used in windshields to melt ice and snow gathering on the surface of the windshield, and, of course, such heating elements would have the same operation in this visor if used.

The visor is mounted in a suitable housing or casing 5 mounted within the car immediately under the top 1 and also immediately in back of the slot 4 in the top. This may be welded or bolted to the top either directly or by suitable brackets 6, and also similarly welded or bolted at its front edges are the flanges 7. This casing includes a top wall 8 and the bottom wall 9 spaced a sufficient distance so that the visor 3 may be retracted and enclosed between them, and they are curved transversely to correspond with the curvature of the visor. The plates 8 and 9 are mounted at their opposite edges on a channel shaped member 10 carrying a rubber or felt channel or grooved member 11 to receive the opposite side edges of the visor and to provide guide means for it. To prevent entrance of moisture in the slot 4, a suitable gasket or gaskets 12 of rubber or other suitable material may be provided at the slot to engage the opposite surfaces of the visor.

As the casing is curved transversely to conform to the shape or curvature of the plastic visor, it keeps the visor rigid without other support. A suitable means is provided in the casing for projecting the visor to the operative position or retracting it into the casing. This may be a mechanism such as used for raising and lowering car windows, but a simple and effective operating means is shown in the drawing. That shown in Figs. 1 to 14 comprises a rack 13 connected by any suitable means, such as the plates 14, to the rear edge portion of the visor, and passing through a sheet metal housing 15 mounted on the rear edge of the casing 5. Mounted in this housing is a shaft or spindle 16 to which is pinned a gear or pinion 17 meshing with the rack 13, this pinion being secured to the shaft to turn with it by any suitable means, such as the pin 18 mounted in the shaft and projecting into a slot 19 in the gear. Mounted under the housing or casing 5, and beneath the top 1 is the roof or finish of the car, indicated at 20, and the casing and the operating mechanism are mounted between this roof and the top of the car, so that they are out of sight. The lower end of this shaft 16 projects through this roof and the opening may be covered with a finish or cover plate 21 secured by any suitable means, such, for example, as sharp points 22 which may be driven into the material of the roof. The shaft has a square or noncircular end 23 on which is mounted base 24 having a similarly shaped socket 25 to receive this end of the shaft and in which it may be secured by any suitable means, such as the screw 26. Secured to this base is a curved handle or hand grip 27, its opposite ends 29 being square and seating in similarly shaped notches 28 in the opposite sides of the base 24 leading from its inner or top wall, so that the ends 29 of the handle may be seated in these notches and held therein by a spring steel plate 30 seating on the inner face of the base 24 and secured thereto by any suitable means, such as spot welding, at opposite sides and about half way between the notches, as indicated at 24a. This completes the handle assembly, which may then be mounted on the shaft 16, and as this is located beneath the roof 20 of the car it is in position where it may be readily grasped by the driver without changing his position to operate the gear 17, and thus shift the visor between its extended position in front of and over the windshield or retracted into the casing and the car body. The plate 30 may be a spring plate forming a means to hold the ends of the handle in the notches, which notches are somewhat larger than the ends of the handle to permit it to be turned to either the upright position or lie against the roof. The spring plate therefore acts to hold the handle in either the upright operating position or flat against the roof when not in use.

In Figs. 15 and 16 is shown a somewhat modified construction of means for shifting the visor between the extended and retracted positions. The visor is the same as in the first form and is mounted in the same position and within a casing 31 similar to the casing 5 of the first form, and mounted in a similar manner under the top 1 and between it and the roof 20. In this case, however, instead of a rack and gear operating mechanism, the lower wall of the casing 31 is provided with a longitudinal central slot 32, and the roof 20 is provided with a similar slot 33 in alignment with it but somewhat wider. Secured to the rear edge portion of the visor is a stud 34 with an enlarged intermediate portion 35 between the visor and the lower wall 36 of the casing so as to slide on the top surface of this wall, and projecting downwardly from this enlargement through the slot 32 is a threaded portion 37 on which is threaded a hand grip or knurled knob 38, the threaded portion of which is larger than the slot 32 so that the lower wall 36 of this casing is between this member and the enlargement 35 of the stud. The knob 38 may therefore be tightened so as to clamp this wall between the portion 39 and the enlargement 35 to thus clamp the visor in different adjusted positions. By merely loosening this knob the driver may readily extend or retract the visor without changing his position and then, by clamping the knob, secure the visor in adjusted position.

The visor may have a plain forward edge, or, as shown in Fig. 2a, it may be provided with a beading or molding 40 to match the finish of the car.

Due to the transverse curvature of the plastic visor, it blends in with the lines of the car and this curvature also gives the visor much greater strength and stiffness, so that no additional support is required for it when it is in the extended position forwardly and over the windshield. It effectively protects the windshield, and in ordinary circumstances will keep the greater portion of rain, snow, sleet and so forth off the windshield and thus prevent blurring and icing conditions, and either obviates use of the ordinary windshield wiper or greatly reduces the work required of this wiper, so that the windshield is kept clear at all times. Also, as suggested, the visor may be tinted or otherwise treated to cut down glare of the sun or lights, thus obviating the use of auxiliary sun visors within the car. In the specification and claim the term "transparent" is used in a generic sense as including transparent or semi-transparent or similar material. That is, it is sufficiently clear to transmit light and not interfere with required visibility, but, as suggested, it may be tinted or somewhat colored or otherwise treated to prevent or reduce glare. It will also be clear that this visor may be readily extended or retracted by the driver while in the driving position and thus its operation will in no way interfere with his operation of the car.

Having thus set forth the nature of my invention, I claim:

In a car including a windshield, a transversely curved top over said windshield provided with a similarly curved slot in its front wall just over said windshield, a one piece visor formed of a thick rigid sheet of molded plastic transversely curved similarly to said top and slot, said transverse curvature and thickness being such as to add sufficient strength and rigidity to the one piece visor so that it is self-supporting when in extended position forwardly of the slot against wind and other pressures incident to operation of the car, a closed unitary casing curved similarly to the top and slot concealed between the car top and vehicle roof and having an open front alining with said slot, means for supporting the casing from the bottom of the car top, said casing being of approximately the size of the visor and serving to contain the same therein when the visor is retracted, grooved guides on opposite sides of the casing in which the side edges of the one piece visor are directly engaged and adapted to slide, said grooves forming the sole support for the visor in either extended or retracted positions, and separate means within the vehicle engaged with the rear portion of the visor to slide the same in the grooved guides between extended and retracted positions.

CHRISTABEL S. NICHOLS.

REFERENCES CITED

The following references are of record in the file of this patent:

UNITED STATES PATENTS

| Number | Name | Date |
|---|---|---|
| 1,484,687 | Veeder | Feb. 26, 1924 |
| 1,750,888 | Harrold | Mar. 18, 1930 |
| 1,845,577 | Berliawsky | Feb. 16, 1932 |
| 1,989,592 | Ghazal | Jan. 29, 1935 |
| 2,326,357 | Horton | Aug. 10, 1943 |

FOREIGN PATENTS

| Number | Country | Date |
|---|---|---|
| 54,598 | Norway | Nov. 5, 1934 |